G. A. BOOMER.
FIXTURE LOOP.
APPLICATION FILED MAY 17, 1916.
1,212,318.
Patented Jan. 16, 1917.
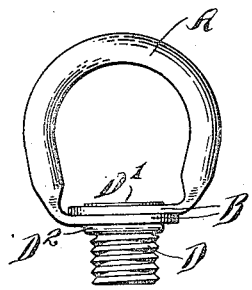
Fig. 1
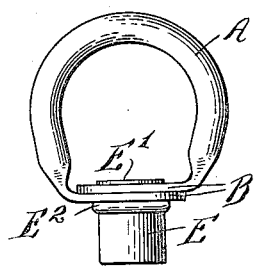
Fig. 4
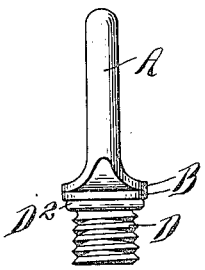
Fig. 2
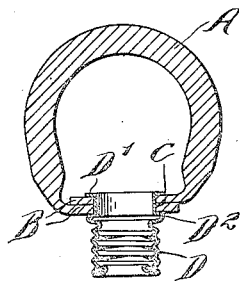
Fig. 3
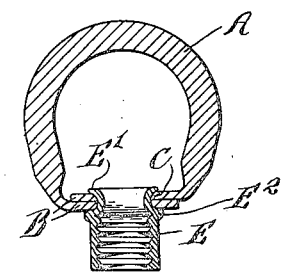
Fig. 5
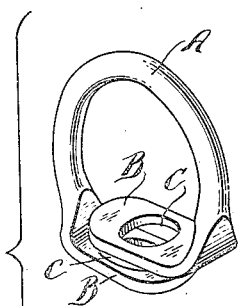
Fig. 6
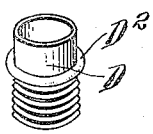
Inventor
Geo. A. Boomer.
By Hull Smith Brock & West
Attys.

UNITED STATES PATENT OFFICE.

GEORGE A. BOOMER, OF WATERBURY, CONNECTICUT, ASSIGNOR TO THE PLUME & ATWOOD MANUFACTURING COMPANY, OF WATERBURY, CONNECTICUT, A CORPORATION OF CONNECTICUT.

FIXTURE-LOOP.

1,212,318.  Specification of Letters Patent.  Patented Jan. 16, 1917.

Application filed May 17, 1916. Serial No. 97,998.

*To all whom it may concern:*

Be it known that I, GEORGE A. BOOMER, a citizen of the United States, residing at Waterbury, in the county of New Haven and State of Connecticut, have invented a certain new and useful Improvement in Fixture-Loops, of which the following is a full, clear, and exact description, reference being had to the accompanying drawings.

This invention relates generally to electric light fixtures and more particularly to a fixture loop for suspending an incandescent electric light socket and connected parts.

The invention also comprehends the method of making such fixture loops.

Heretofore these loops have been made of either cast brass or cast iron, in one piece, requiring machining, tapping and drilling all of which operations are expensive as compared with the simple method hereinafter described and claimed.

The object of the invention is to construct a fixture loop from round wire and a shell bushing or nipple, the shell bushing or nipple serving to connect the ends of the wire after being shaped to provide a loop, and the invention consists in flattening the ends of a piece of round wire, aperturing said flattened ends, bending the wire into the form of a loop and bringing the flattened and apertured ends into register and connecting said ends by means of a shell bushing or nipple which serves to connect the ends of the loop and also to provide the necessary connection for the incandescent socket.

In the drawings forming a part of this specification Figure 1 is a face view of a fixture loop constructed in accordance with my invention, the shell nipple being shown connected to the loop; Fig. 2 is an end view of the same; Fig. 3 is a sectional view thereof; Fig. 4 is a face view of a fixture loop embodying my invention and having the shell bushing; Fig. 5 is a sectional view of the same; and Fig. 6 is a view illustrating the manner of connecting the parts.

In carrying out my invention I employ a piece of round wire A of predetermined length and flatten the ends thereof as shown at B, said flattened ends being apertured at C and the wire is then bent to provide the proper form of loop, the flattened ends being overlapped and the apertures C brought into register. These overlapped ends are then connected by means of a shell nipple D or a shell bushing E, as the case may be, the nipple connection being shown in Figs. 1, 2, 3 and 6 and the bushing connection in Figs. 4 and 5. In both constructions the end of the tubular connecting member is inserted through the registering apertured ends of the loop and rolled over as shown at D' in Fig. 3, and E' in Fig. 5; the nipple D having a shoulder $D^2$ and the bushing E having a shoulder $E^2$, against which the flattened end of the loop is bound when the end is rolled over or headed down, as most clearly shown in the drawing.

By constructing the loop from wire, the cost of manufacture is greatly reduced and a loop is provided equally as strong and durable as the cast metal loop heretofore in common use, and the assemblage of the parts can be accomplished in much less time than the operations necessary in connection with the cast metal loops.

It is obvious that my invention can be carried out in a variety of different forms and I therefore do not limit myself to any precise construction except those covered by the appended claims.

Having thus described my invention, what I claim is:—

1. A fixture loop having overlapping apertured ends, and a shouldered tubular member inserted in said apertured ends, the end of said member being headed down upon the overlapping ends.

2. A fixture loop having overlapping apertured ends, and a threaded tubular member provided with a shoulder, the end of said member being inserted in the overlapping apertured ends and headed thereon.

In testimony whereof, I hereunto affix my signature in the presence of two witnesses.

GEO. A. BOOMER.

Witnesses:
D. A. WILLIAMS,
GEORGE BOLGER.